Figure 1:
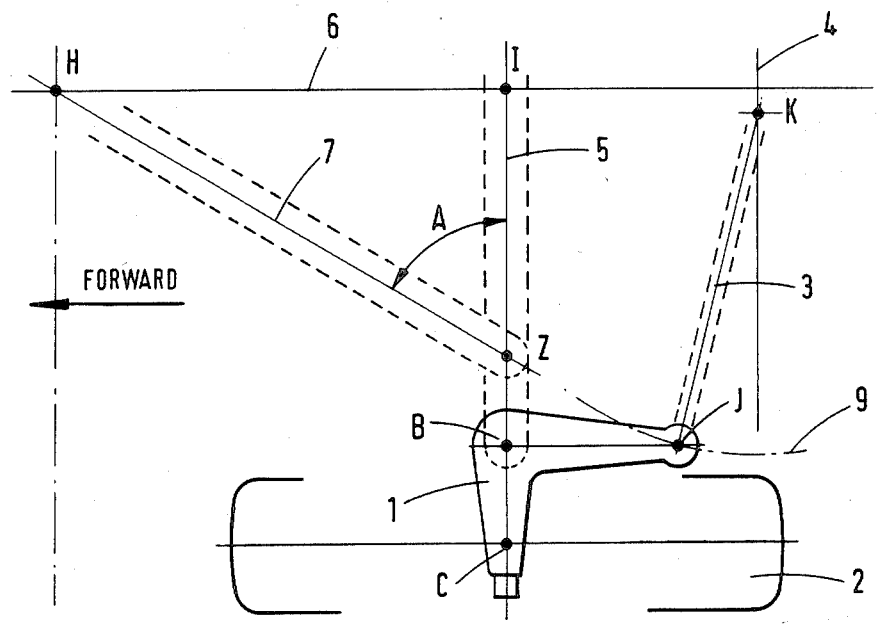

United States Patent [19]

Warner

[11] Patent Number: 4,738,458
[45] Date of Patent: Apr. 19, 1988

[54] STEERABLE WHEEL SUSPENSION SYSTEM

[75] Inventor: Dennis R. Warner, Northfield, United Kingdom

[73] Assignee: Austin Rover Group Limited, Coventry, England

[21] Appl. No.: 8,624

[22] Filed: Jan. 29, 1987

[51] Int. Cl.$^4$ .............................................. B60G 3/00
[52] U.S. Cl. .................................. 280/668; 280/675; 280/690
[58] Field of Search ................ 280/668, 690, 674, 675

[56] References Cited

U.S. PATENT DOCUMENTS 3,223,433  12/1965  Parks ..................................... 280/674
4,039,041   8/1977  Farrow ................................. 280/668
4,273,356   6/1981  Sakata et al. ......................... 280/675

Primary Examiner—Kenneth R. Rice
Attorney, Agent, or Firm—Hayes, Davis & Soloway

[57] ABSTRACT

A steerable wheel suspension system comprising: a hub suspended from the vehicle body by a spring and damper strut system, a steering arm extending outwards and forwards from a steering rack positioned relatively low down and behind the engine to a ball joint on the hub, a first linkage arm extending outwards and rearwards from a forwardly mounted bush on the vehicle body to a ball joint on the hub, and a second linkage arm extending outwardly and forwardly from a hinge pivot on the vehicle body to a pivot joint on the first linkage arm, the arrangement being such that during rearward compliance of the hub, e.g. during braking, the second linkage arm constrains the pivot and hence the ball joint to move along an arc which is matched with an arc along which the ball joint is constrained to move by the steering arm and so reduce or eliminate induced steer during rearward compliance. The mounting of the first linkage arm directly to the hub also avoids multiplying the forces it imposes upon the bush and allows the provision of a less substantial forwards structural member in the vehicle body to support the bush, which in turn produces a reduction in overall body width.

13 Claims, 5 Drawing Sheets

STEERABLE WHEEL SUSPENSION SYSTEM

This invention relates to a steerable wheel suspension system and more particularly to a suspension system for a front wheel of a front wheel drive vehicle in which the steering rack is positioned behind the engine and low down with respect to the engine.

The space available for a suspension system of a steerable wheel is subject to many constraints imposed by the body construction within the wheel arch, the position of the steering mechanism and the clearances required to allow for the wheel to steer. Further constraints are imposed if the suspension is for the front wheel of a front wheel drive vehicle due to the close proximity of the engine and/or transmission casing and the connection of the wheel hub to the final drive of the transmission system. One conventional suspension system (which is described in more detail below) comprises a wheel hub suspended by a spring and damper strut system, a lower link extending outwardly from the vehicle body to the hub in a direction substantially perpendicular to the centre line of the vehicle body and a tie bar extending outwardly and rearwardly from the vehicle body to a point on the lower link. As the steering rack in this type of vehicle is usually positioned behind the engine and relatively low down with respect thereto, the steering arm connecting the steering rack to the hub has to be angled forwards. With such an arrangement, the constraint imposed by the steering arm during rearward compliance of the hub, eg during braking, has a tendancy to cause the wheel to toe-in. In addition, as the point at which the tie bar is connected to the lower link is a substantial distance from the point at which braking forces act upon the hub, the longitudinal loads imposed by the tie bar on the vehicle body are magnified so the body has to be designed to bear substantial loads at this point. This invention aims to provide a relatively simple suspension system which reduces this undesirable steering effect during rearward compliance of the hub whilst at the same time reducing the longitudinal load imposed by the tie bar on the vehicle body.

According to this invention there is provided a suspension system comprising: a hub suspended from the vehicle body and steerable about a steer axis; a steering arm extending outwardly and forwardly from a steering mechanism mounted on the vehicle body to the hub; a first linkage arm extending outwardly and rearwardly from a first mounting on the vehicle body to the hub; and a second linkage arm extending outwardly and forwardly from a second mounting on the vehicle body to a point on the first linkage arm, the arrangement being such that during rearward compliance of the hub the constraint imposed by the second linkage arm on the movement of the hub reduces any tendency for the constraint imposed thereon by the steering arm to alter the steer attitude.

Preferred features of the invention will be apparent from the description of the preferred embodiment and from the subsidiary claims of the specification.

Terms such as "forwards", "rearwards", "outwards", "inwards", "up" and "down" used in this specification refer for ease of understanding to directions in relation to a motor vehicle standing on a level surface. It will be appreciated, however, that a suspension system similar to that described in the claims of this specification can be constructed by reversing the references to "rearwardly" and "forwardly" to produce a mirror image of the suspension about a plane perpendicular to the centre line of the vehicle body and the claims are to be interpreted as to cover such mirror images.

Figure 2:
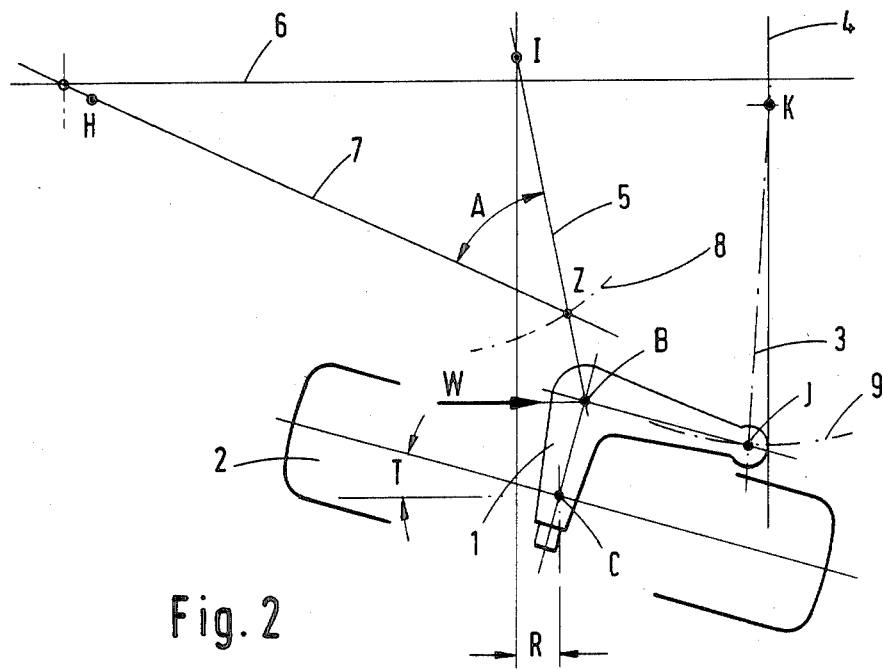
Figure 3:
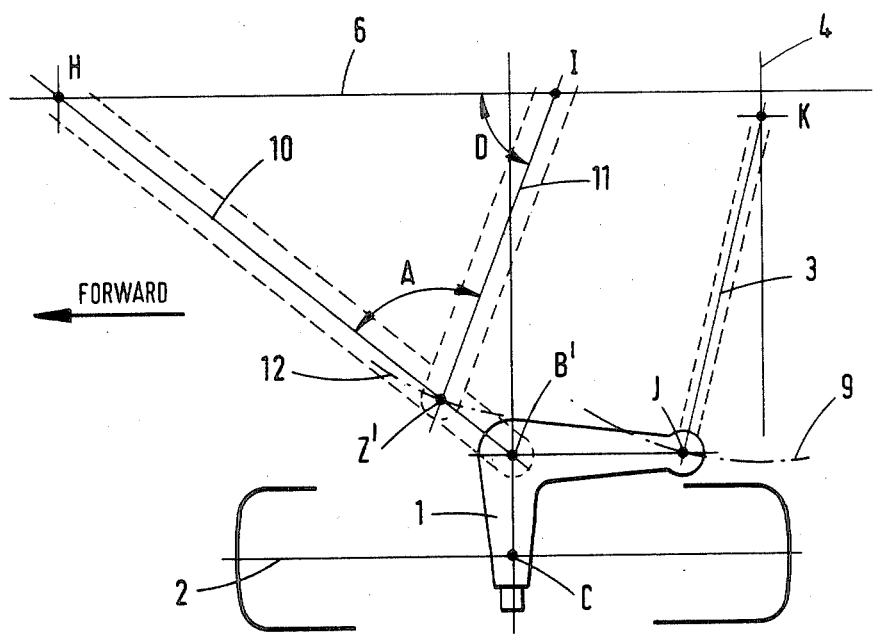
Figure 4:
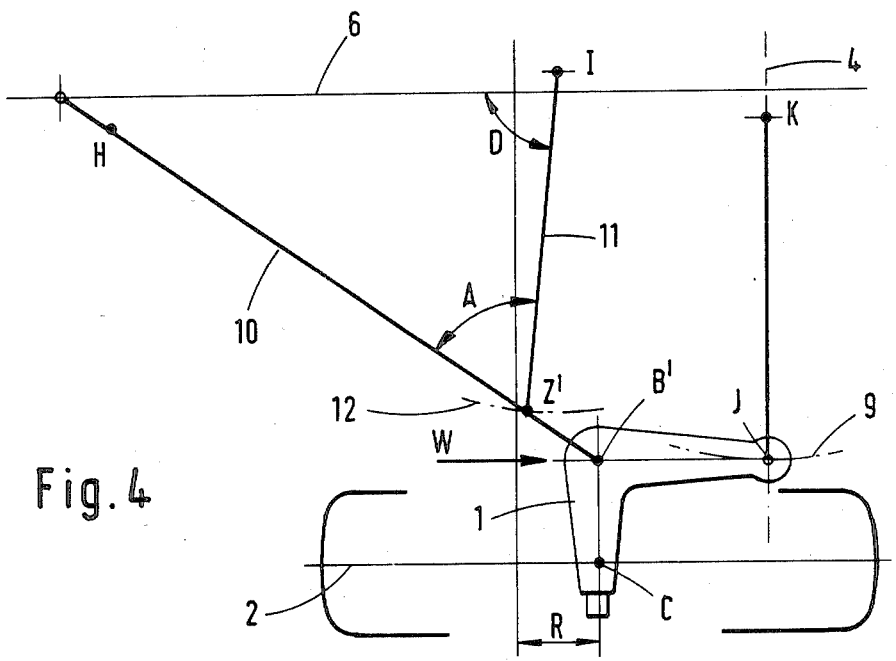
Figure 5:
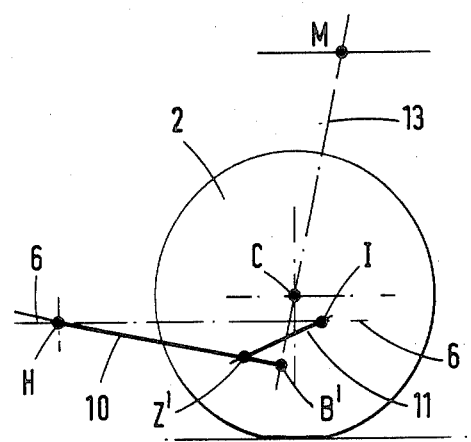
Figure 6:
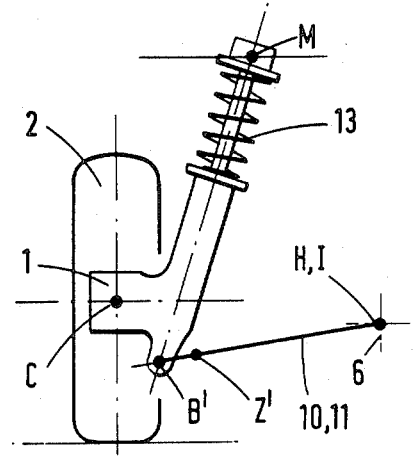
Figure 7:
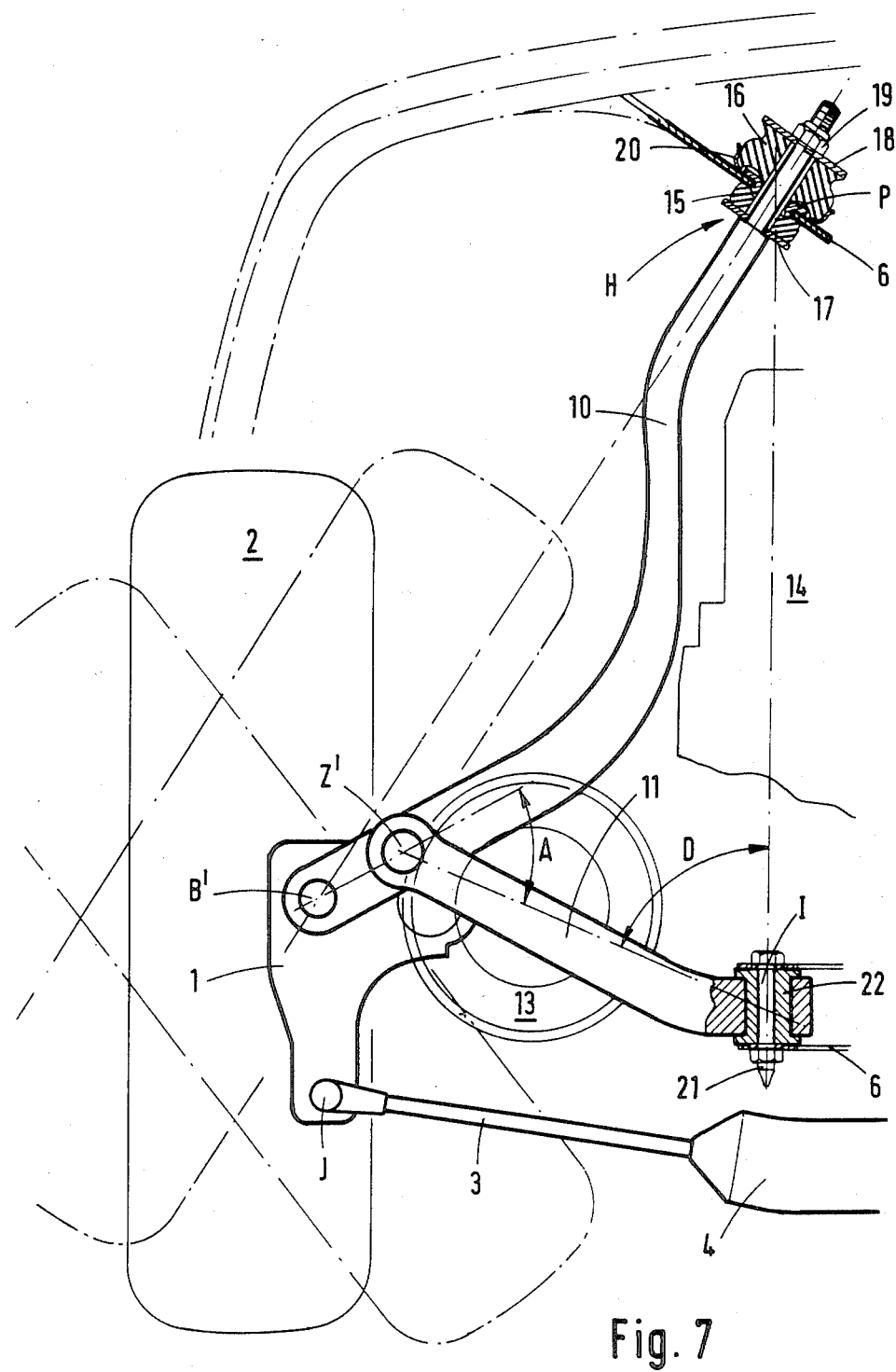
Figure 8:
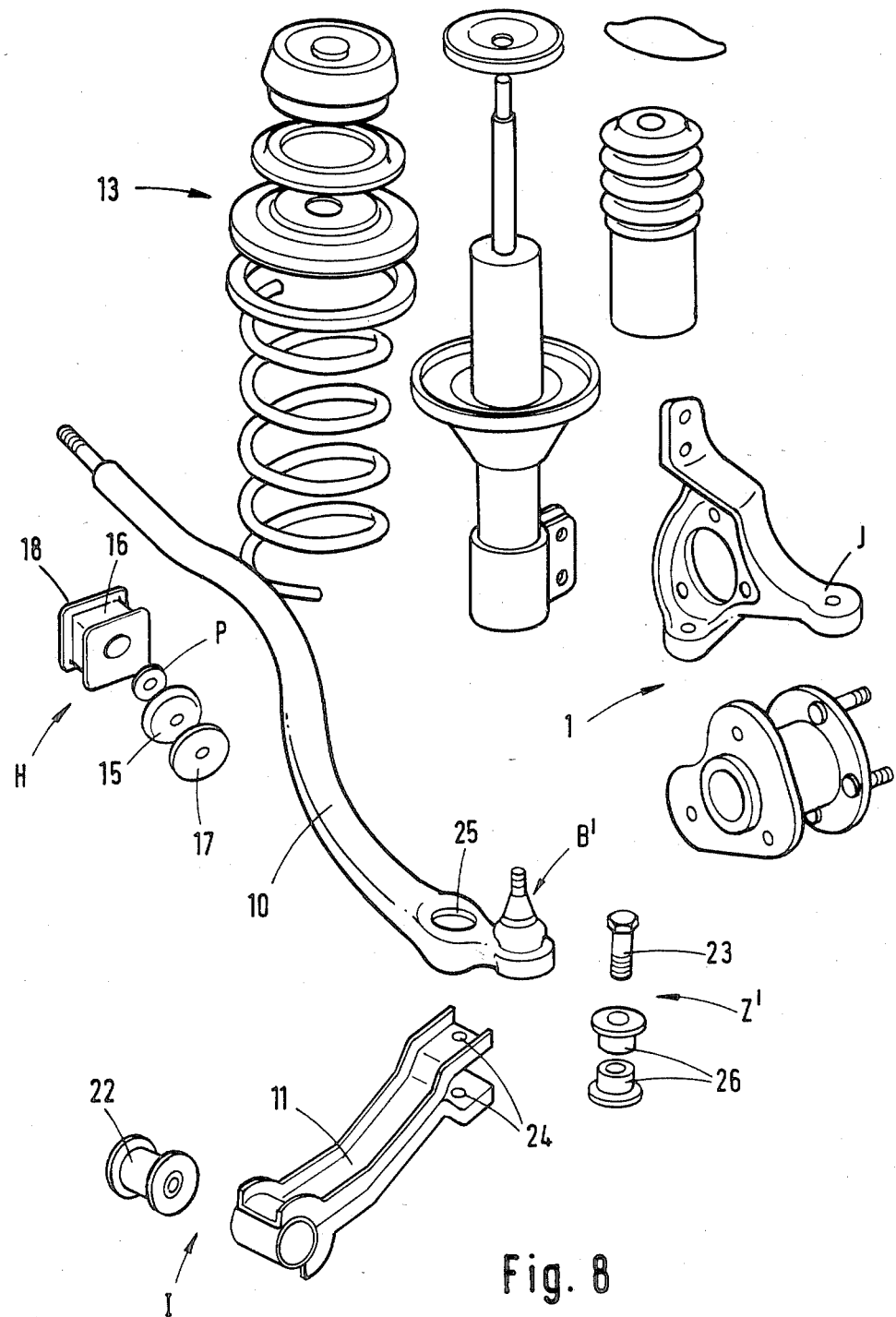

The invention will now be described merely by way of example, with reference to the accompanying drawings, in which:

FIGS. 1 and 2 are diagrams illustrating the normal position of a known suspension system and its position (shown exaggerated) during rearward compliance;

FIGS. 3 and 4 are diagrams corresponding to those of FIGS. 1 and 2 for an embodiment of a suspension system according to this invention, and FIGS. 5 and 6 are diagrams showing side and plan views of the system;

FIG. 7 is a plan view of a suspension system according to this invention installed in a front wheel drive vehicle with the main features shown in heavy lines; and FIG. 8 is an exploded perspective view of components making up the suspension of FIG. 7.

FIG. 1 is a diagrammatic plan view of the normal position of a known suspension system which comprises a hub 1 carrying a wheel 2, a steering rod 3 connected between a ball joint J on the hub 1 and a ball joint K on a steering rack 4, a lower link 5 connected between a pivot mounting I on the vehicle body 6 and a ball joint B on the hub 1, and a tie bar 7 connected between a bush mounting H on the vehicle body 6 and a pivot joint Z on the lower link 5. The hub 1 is suspended from the vehicle body by a spring and damper strut system (not shown) and is steerable about an axis approximately perpendicular to the plane of the paper passing through or close to the ball joint B. The lower link 5, which is perpendicular to the centre line of the vehicle body, and the tie bar 7, which extends outwardly and rearwardly from the vehicle body, are together pivotable about the line HI so as to permit the wheel 2 to move up and down with respect to the vehicle body.

FIG. 2 is a similar view to FIG. 1 but shows the position of the system during rearward compliance, eg when the vehicle is braking. During braking, a force W is imposed on the ball joint B by the wheel centre C and this causes the ball joint B to move generally rearwards by a distance R of up to about 18 mm, due to the resilience of the mountings at H, I and Z and the flexure of the system. During this rearward movement of the ball joint B, the pivot mounting I is moved generally inward by up to about 2 mm towards the centre line of the vehicle body, the bush mounting H is pulled outwards and rearwards in a direction generally towards the ball joint B and the angle A between the lower link 5 and the tie bar 7 is reduced. The pivot mounting I thus provides an outward reaction to counteract the couple imposed on the system by the force W and the bush mount H provides the majority of the reaction in the forward direction to counteract the force W. However, as the tie bar 7 is connected to the lower link 5 at the pivot joint Z, the reaction force at the bush mounting H is multiplied by a lever ratio of about BI:ZI, which may be as great as 2:1 due to packaging constraints on the position of the pivot Z, and thus produce forces of up to twice the magnitude of the force W at the bush mounting H.

As will be seen from FIG. 2, the pivot joint Z is constrained to move along an arc 8 by the lower link 5 and the tie bar 7 during rearward compliance and thus moves slightly inwards as it is moved rearwards. The ball joint B is thus constrained to move along a similar arc. However, the ball joint J connecting the steering arm 3 to the hub 2 is constrained to move along an arc 9 by the steering rod 3 and, as the steering rod 3 is angled forwards, the ball joint J moves slightly outwards as it is moved rearwards. The net result is that the steer attitude of the hub 1 is altered to cause the wheel 2 to toe-in by an angle T during rearward compliance. This induced steer during rearward compliance is highly undesirable.

FIG. 3 is a diagrammatic plan view of the normal position of one embodiment of a suspension system according to this invention. The parts of this system corresponding to those illustrated in FIG. 1 are given similar reference numerals. In this system the linkage between the hub 1 and the vehicle body 6 comprises a first linkage arm 10 connected between the bush mounting H and a ball joint B' on the hub 1 and a second linkage arm 11 connected between the pivot mounting I and a pivot joint Z' on the first arm 10. It should be noted that the second linkage arm 11 extends outwardly and forwardly from the pivot mounting I to the pivot joint Z' so that an imaginary line IZ' between the inner and outer ends of the second linkage arm 11 is inclined at an angle D to the line HI. The hub 1 is suspended from the vehicle body by a spring and damper strut system 13 (see FIGS. 7 and 8) and is steerable about a steer axis approximately perpendicular to the plane of the paper passing through or close to the ball joint B'. The first and second linkage arms 10 and 11 are of stiff design and are together pivotable about the line HI, or a line close thereto, to allow the wheel 2 to move up and down with respect to the vehicle body. Preferably, the axis of the pivot mounting I and the line HI are substantially horizontal and parallel to the centre line of the vehicle body but, in some arrangements, they may be inclined to these lines. The axis of the pivot mounting I is also preferably coincident and thus parallel to the line HI but can be displaced therefrom and/or inclined thereto.

FIG. 4 is a similar view to FIG. 3 but shows the position of the system during rearward compliance. The force W acting on the ball joint B' during braking moves the ball joint B' rearwards by a distance R and so moves the pivot mounting I inwards and the bush mounting H in the direction of the ball joint B' and reduces the angle A between the first and second linkage arms 10 and 11. The bush mounting H provides the majority of the reaction in the forward direction to counteract the force W, but as the first linkage arm 10 is connected to the ball joint B' the reaction at the bush mounting H is not increased by any lever ratio. The reaction at the bush mounting H is thus much reduced compared to the system shown in FIG. 1 so removing the need to provide a large forwards structural member in the vehicle body to support the bush mounting H and, in turn, reducing the overall width of the vehicle body.

The movement of the hub 2 during rearward compliance is constrained by the first and second linkage arms 10 and 11 and by the steering rod 3. The system is designed so that the pivot joint Z' is constrained to move along an arc 12 so that the pivot joint Z' moves outwards slightly as it is moved rearwards. This is achieved as the second linkage arm 11 is inclined so that its outer end is forward of its inner end in the normal position of the suspension as shown in FIG. 3. The ball joint B' is thus constrained to move along a similar arc. The ball joint J connecting the steering arm 3 to the hub 1 again moves outwards slightly as it is moved rearwards as in the system illustrated in FIG. 1. Thus, as both the ball joints B' and J move outwards slightly as they are moved rearwards, the induced steer during rearward compliance can be reduced or eliminated by matching the arcs of movement of the pivot joint Z' and the ball joint J. In such an arrangement, the steering rod 3 and the second linkage arm 11, or at least the lines joining their ends, are thus similarly inclined when viewed in plan. The pivot joint Z' is preferably positioned as closely adjacent to the ball joint B' as is practicable. The pivot joint Z' could conceivably be coincident with the ball joint B' although this would require a complex and expensive joint between the hub 1 and the first and second linkage arms 10 and 11.

FIGS. 5 and 6 show diagrammatic side and rear views respectively of the suspension system shown in FIGS. 3 and 4 although the steering rod 3, ball joint J and steering rack 4 are omitted for clarity. The views indicate the position of the spring and damper strut system 13 and the mounting M by which this is attached to the vehicle body. The hub is steerable about an axis coincident with or close to the axis of the spring and damper strut system 13 and which passes through or close to the ball joint B'.

FIG. 7 is a plan view of a preferred embodiment of this invention forming the suspension system of a front wheel of a front wheel drive vehicle. The principal parts of the suspension system corresponding to the parts shown diagrammatically in FIG. 3 are given the same reference numbers as the corresponding parts in that FIG. FIG. 8 is an exploded perspective view of the suspension system and shows the construction of the parts thereof in more detail. The views shown in these Figures illustrate practical forms of the first and second linkage arms 10 and 11 and of the bush mounting H, the pivot mounting I and the pivot joint Z'.

The position of the bush mounting H attaching the first linkage arm 10 to the vehicle body 6 is dictated by the body construction within the wheel arch and the position of the engine 14. Ideally, the bush mounting H would be positioned closer to the pivot mounting I than shown in the FIG. 7 but cannot since this space is occupied by the engine 14. The bush mounting H is thus positioned on the first available portion of the vehicle body along the line from H to I and is in practice positioned relatively close to the front of the vehicle body. It is undesirable to extend a large structural member of the vehicle body as far forwards as the bush mounting H as it would either reduce the width of the space available for the engine 14 (or increase the overall width of the vehicle body) or would need to pass around the engine by going above or below it. It is therefore important to ensure that the loads imposed on the vehicle body by the bush mounting H and the first linkage arm 10 are not so great as to require the body to be built with substantial strength in this area. As explained above, by attaching the first linkage arm 10 directly to the ball joint B' on the hub 1, any unnecessary multiplication of the forces imposed on the bush H is avoided.

As the first linkage arm 10 extends from the bush mounting H in such a forward position to the ball joint B' on the hub 1, it is necessary to shape the linkage arm 10 so as to provide clearance for the wheel 2 to steer. FIG. 3 shows the position of the wheel in a straight position and in the maximum left hand and right hand lock positions and it can be seen that the imaginary line joining the bush mounting H and the ball joint B' passes through the wheel 2 in the maximum right hand lock position. The first linkage arm 10 is formed so as to be approximately S-shaped when viewed in plan. The inner end extends from the bush mounting H in a direction approximately along the line towards the ball joint B' and then bends rearwards to provide additional clearance for the wheel 2 to steer before bending outwards to the ball joint B'.

The second linkage arm 11 is connected by the pivot mounting I to the vehicle body 6 at a position further rearwards than the pivot joint Z' connecting it to the first pivot arm 10. The second linkage arm 11 has a bent form as illustrated in FIG. 7. With this arrangement the inner end of the linkage arm 11 extends outwards from the pivot mounting I in a direction perpendicular to the center line of the vehicle body. The axis of the pivot mounting I is thus parallel to the centre line of the vehicle body and it is also arranged to be coincident with the line HI. The second linkage arm need not extend far from the pivot mounting I in this direction before bending forwards to the pivot joint Z'. The imaginary line IZ' connecting the ends of the second linkage arm 11 is thus inclined by an angle D to the line HI and in the arrangement illustrated in FIG. 3 the part of the arm 11 extending from the bent part of the inner end thereof to the pivot joint Z' lies approximately parallel to this imaginary line. The second linkage arm 11 could have a straight form but this would either require pivot mounting I to be formed at an angle through the inner end of the arm, so that the axis of the pivot mounting I is parallel to the centre line of the vehicle body, or require the axis of the pivot mounting to be inclined to the centre line of the vehicle body by an angle of up to (90−D) degrees. The latter arrangement is not preferred as it would impose an unnecessary strain on the pivot joint Z' since the axis of the pivot joint Z' would not remain perpendicular to the line HI as the hub 1 moved up and down. Also, movement of the pivot joint Z' along an arc about the axis of the pivot mounting I would impose a further undesirable backwards and forwards movement on the hub 1 as it moved up and down.

The bush mounting H illustrated in FIG. 7 is designed to be flexible to allow the first linkage arm 10 to pivot about the line HI and to move along the imaginary line HB' joining its two ends. The bush mounting H comprises resilient rubber grommets 15 and 16 on each side of a portion of the vehicle body 6 through which the first linkage arm 10 extends. The grommets 15 and 16 are held in compression between two plates 17 and 18 on opposite sides of the said portion of the vehicle body 6 by a nut 19 fitted onto a screw thread on the end of the first linkage arm 10. The rubber grommet 16 is contained within a cup-member 20 into which it is compressed when the first linkage arm 10 is moved in the direction of the ball joint B' and is designed so that the grommet 16 is effectively stiffened as it is compressed into the cup-member 20. A relatively hard plastics ring P is also fitted within the aperture in the vehicle body 6 through which the first linkage arm passes to prevent the arm fouling the vehicle body 6 under extreme deflections.

The pivot mounting I illustrated in FIG. 7 comprises a pivot pin 21 which holds the second linkage arm within a bracket provided on the vehicle body 6. The pivot pin 21 passes through a cylindrical, resilient rubber member 22 which is fitted within a bore through the inner end of the second linkage arm 11 to form a hinged joint. The pivot mounting H thus allows the second linkage arm 11 to pivot about the axis of the pivot pin 21 but restrains the arm against any substantial deflection about axes perpendicular thereto. The resilience of the rubber member 22 also allows the second linkage arm 11 to move inwards slightly during rearward compliance of the hub 1 as described in relation to FIG. 4. In the illustrated arrangement, the axis of the pivot pin 21 is coincident with the line HI so the second linkage arm 11 not only hinges about the pivot pin 21 but the first and second linkage arms 10 and 11 together hinge about the line HI.

The pivot joint Z' is constructed in a manner somewhat similar to the pivot mounting I and is shown in more detail in FIG. 8. A pivot pin 23 passes through apertures 24 in the outer end of the second linkage arm 11, which is bifurcated, and through a bore 25 in the first linkage arm 10 adjacent to the ball joint B'. The pivot pin 23 also passes through a two-part resilient bush 26 mounted within the bore 25. The bush 26 is preferably stiffer than the bush 22 used in the pivot mounting I as it need not allow for any movement of the pivot pin 23 perpendicular to its axis. The pivot joint Z' allows the first and second linkage arms 10 and 11 to rotate relative to each other about the axis of the pivot pin 23 but restrains them from any substantial relative movement about axes perpendicular thereto. The axis of the pivot pin 23 is perpendicular to the imaginary lines IZ' and HZ' and as the axis of the pivot pin 21 is coincident with the line HI the axis of the pivot 23 remains perpendicular to the line HI as the hub 1 moves up and down.

In the arrangement illustrated in FIGS. 7 and 8, the angle D is approximately 60° and the angle A is also approximately 60°. These angles will, however, change by several degrees during rearward compliance of the hub 1. The magnitude of the angles D and A depends upon the geometry of the suspension and the packaging constraints but it is a further advantage of this invention that the length of the second linkage arm 11 and the angle D can be altered relatively easily during the design of the system in order to match the arcs 9 and 12 as this can be done without re-designing or making any substantial changes to the remainder of the system.

The suspension system could also comprise an anti-roll bar (not shown) connecting it with the suspension system on the opposite side of the vehicle. The anti-roll bar would preferably be attached to the hub 1 at a position rearwards of the wheel centre C.

I claim:

1. A steerable wheel suspension system for a vehicle comprising:
a hub suspended from the vehicle body and steerable about a steer axis; a steering mechanism mounted on the vehicle body; a steering arm extending outwardly and forwardly from the steering mechanism to the hub; a first mounting on the vehicle body; a first linkage arm extending outwardly and rearwardly from the first mounting to the hub; a second mounting on the vehicle body; a second linkage arm extending outwardly and forwardly from the second mounting to a point on the first linkage arm; the constraint imposed by the second linkage arm during rearward compliance of the hub on the movement of the hub provides means to reduce any tendency for the constraint imposed thereon by the steering arm to alter the steer attitude of the hub.

2. A suspension system as claimed in claim 1 in which the second linkage arm and the steering arm are arranged so that the combined effect of the constraint they impose on the hub is to cause the hub to move outwardly during rearward compliance thereof.

3. A suspension system as claimed in claim 1 in which the second linkage arm is pivotably connected to the vehicle body at the second mounting about a substantially horizontal hinge axis.

4. A suspension system as claimed in claim 3 in which the first and second linkage arms are pivotally connected to each other about a pivot axis passing through the said point and perpendicular to the hinge axis.

5. A suspension system as claimed in claim 4 in which the pivot axis is adjacent to the connection between the first linkage arm and the hub.

6. A suspension system as claimed in claim 5 in which the connection between the first linkage arm and the hub lies on or adjacent to the steer axis thereof.

7. A suspension system as claimed in claim 6 in which the second linkage arm is shaped so as to extend initially outwardly from the second mounting in a direction perpendicular to the hinge axis and then outwardly and forwardly to the pivot axis.

8. A suspension system as claimed in claim 7 in which the second mounting comprises a resilient bush to permit the inner end of the second linkage arm to move inwards towards the vehicle body centre line during rearward compliance of the hub.

9. A suspension system as claimed in claim 8 in which the first mounting comprises a flexible bush which allows the first linkage arm to move substantially in the direction of an imaginary line joining its two ends during rearward compliance of the hub.

10. A suspension system as claimed in claim 9 in which the flexible bush lies on or adjacent to the hinge axis of the second mounting.

11. A suspension system as claimed in claim 10 in which the pivotal connection between the first linkage arm and the hub comprises a ball joint.

12. A suspension system as claimed in claim 11 in which the first linkage arm is shaped so as to extend outwardly and rearwardly from the first mounting substantially in the direction of the ball joint, then bends rearwardly to provide additional clearance for a wheel on the hub to steer and then bends outwardly to the ball joint.

13. A suspension system as claimed in claim 1 being the suspension system of a front wheel of a front wheel drive vehicle.

* * * * *